(No Model.)

J. C. SMITH.
COMPOUND CULINARY TOOL.

No. 265,164. Patented Sept. 26, 1882.

Attest:
F. H. Schott
A. R. Brown.

Inventor:
Julia C. Smith

N. PETERS. Photo-Lithographer, Washington, D. C.

UNITED STATES PATENT OFFICE.

JULIA C. SMITH, OF ASHTON, ILLINOIS.

COMPOUND CULINARY TOOL.

SPECIFICATION forming part of Letters Patent No. 265,164, dated September 26, 1882.

Application filed August 22, 1882. (No model.)

*To all whom it may concern:*

Be it known that I, JULIA C. SMITH, a citizen of the United States, residing at Ashton, in the county of Lee and State of Illinois, have invented certain new and useful Improvements in Combined Cake-Beater, Dish Cleaner and Holder; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in combined culinary tongs, cake-beaters, dish cleaners and holders; and it consists in the peculiar construction and arrangement of parts, as will be hereinafter more fully set forth.

Figure 1:
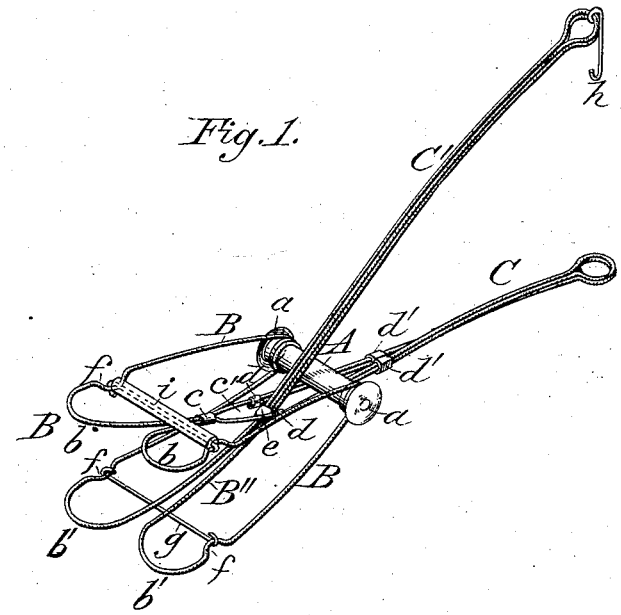
Figure 2:
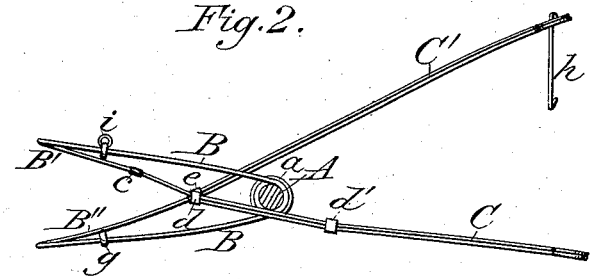
Figure 3:
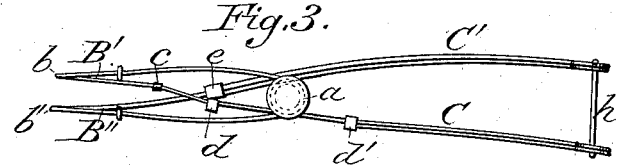

In the annexed drawings, Figure 1 is a perspective view of my improved implement. Fig. 2 is a vertical section of the same, showing the implement with the jaws opened; and Fig. 3 is a side view, showing the jaws closed.

The implement is made of steel spring-wire, and is constructed substantially as follows:

A is a short wooden or metal cylinder, having secured to its ends the caps, disks, or buttons $a\ a$. A wire, B, is coiled around the cylinder A several times adjacent to the buttons $a\ a$ at each end, thus forming springs in the wire and giving elasticity to the same, the disks $a\ a$ preventing the coils from slipping off the cylinder. From the coils the wires B diverge, extending in front of or beyond the cylinder a sufficient distance to form, when bent, the lips or jaws of the implement. From the bends $b\ b$ of the upper jaw the wires extend slightly downward and toward each other, meeting at the point $c$, thus forming the upper jaw, B'. From the point $c$, where the wires of the upper jaw are soldered or otherwise secured together, they again diverge, forming a loop, $c'$, for the passage of the wires forming the lower jaw, and they then pass downward under the cylinder A, meeting again at the point $d'$ a little beyond the cylinder, from whence they continue together a suitable distance to form one of the handles, C, of the device, the end of which handle is a loop, the wires returning upon themselves to the point $d'$, where they are fastened together, thus strengthening and giving bulk to the handle. From the point $d'$ to the points $d\ d$ on the loop $c'$ the wires are doubled on each side for the purpose of strengthening this part of the device.

$b'\ b'$ are bends in the lower jaw, from which the wires extend upward and toward each other and meet at the point $e$, where they are secured together, thus forming the lower jaw, B". From the point $e$ the wires extend together through the loop $c'$ upward, and above and beyond the cylinder A to form the other handle, C'. This handle likewise ends in a loop, the wires returning upon themselves to the point $e$, where they are securely fastened together. The wires B are bent inwardly or notched at the four points $f\ f$ just before reaching the bends $b'\ b'$. Cross-wires $g\ g$, hooked at their ends, extend across the jaws above and below the same to the notches $f\ f$, their hooked ends engaging with the same. These wires $g\ g$ serve as braces, and also to fasten a dish-cloth to the jaws when the implement is used for washing and cleaning dishes, the cloth being held between the wires and the upper and lower jaws, or merely passed around the wires $g\ g$, as desired. A tube of rubber or cork may be placed around the wires $g\ g$, forming a pad or rubbing-surface for cleaning purposes.

By grasping the handles and pressing down the upper one, C', upon the cylinder A, which acts as a fulcrum, the jaws are brought together to grasp the article to be held. By means of a hook, $h$, engaging with the loops on the ends of the handles the jaws may be held stationary after they are closed upon the article to be held. The arrangement of the handles C C', one being passed through the loop $c'$ of the other, serves to steady the spring-jaws B' B" and prevent lateral displacement.

The implement is useful as a dish-washer, as a holder for dishes, and as a tongs to take dishes out of hot water, thus preventing injury to the hands. It can also be used as a batter or egg beater, soap-holder, bread-holder for toasting bread, as a tongs for lifting dried fruits, &c.

The handles, when provided with a proper cleaning material, can be used for cleaning lamp-chimneys.

It will be observed that the implement is simple, efficient, easily cleaned, and adapted to a variety of household purposes.

Having thus described my invention, what I claim as new, and desire to secure by Letters Patent, is—

1. A wire culinary tongs composed of the spring-jaws B′ B″, fulcrumed on a cylinder, A, having enlarged ends, said jaws being provided with handles C C′, substantially as shown and described.

2. In a wire tongs, the combination of the cylinder A, having disks or buttons $a\ a$, the spring-jaws B′ B″, composed of wire B, coiled on said cylinder, the handles C C′, and the retaining-hooks $g\ h$, substantially as shown and described.

3. In a wire tongs, the combination, with the spring-jaws B′ B″, having bends $f\ f$, of the hooks or braces $g\ g$, inclosed in tubes $i$, substantially as shown and described.

In testimony whereof I affix my signature in presence of two witnesses.

JULIA C. SMITH.

Witnesses:
PETER O. SPROUL,
SAMUEL F. MILLS.